United States Patent [19]

Wong

[11] 4,282,582

[45] Aug. 4, 1981

[54] FLOATING POINT PROCESSOR ARCHITECTURE WHICH PERFORMS SUBTRACTION WITH REDUCED NUMBER OF GUARD BITS

[75] Inventor: Wilson T. Wong, Anaheim, Calif.

[73] Assignee: Sperry Rand Corporation, New York, N.Y.

[21] Appl. No.: 45,218

[22] Filed: Jun. 4, 1979

[51] Int. Cl.³ .............................................. G06F 7/50
[52] U.S. Cl. .................................................... 364/748
[58] Field of Search ........................................ 364/748

[56] References Cited

U.S. PATENT DOCUMENTS

| | | | |
|---|---|---|---|
| 3,551,665 | 12/1970 | Powers et al. .................... | 364/748 |
| 3,697,734 | 10/1972 | Booth et al. ...................... | 364/748 |
| 3,699,326 | 10/1972 | Kindell et al. ................... | 364/748 X |
| 4,075,704 | 2/1978 | O'Leary ............................ | 364/748 |

OTHER PUBLICATIONS

Frye "Floating Point Guard Digit" *IBM Tech. Disclosure Bulletin* vol. 10 No. 10 Mar. 1968 pp. 1523-1524.
Sofer et al., "Parallel Pipeline Organization of Execution Unit" *IBM Technical Disclosure Bulletin* vol. 14 No. 10 Mar. 1972 pp. 2930-2033.

*Primary Examiner*—David H. Malzahn
*Attorney, Agent, or Firm*—Donald G. Weber, Jr.; Eugene T. Battjer; William E. Cleaver

[57] ABSTRACT

There is provided a circuit and method for subtracting floating point numbers which are represented by binary bits. In this circuit, the smaller number (minuend) in one register is arranged so that the complement thereof is denormalized and added to the subtrahend (i.e. larger number) and the result of the addition is returned to the original register. At that time, the signal stored in the register is renormalized. In this circuit, the number of guard bits required to guarantee round off accuracy is only two.

18 Claims, 1 Drawing Figure

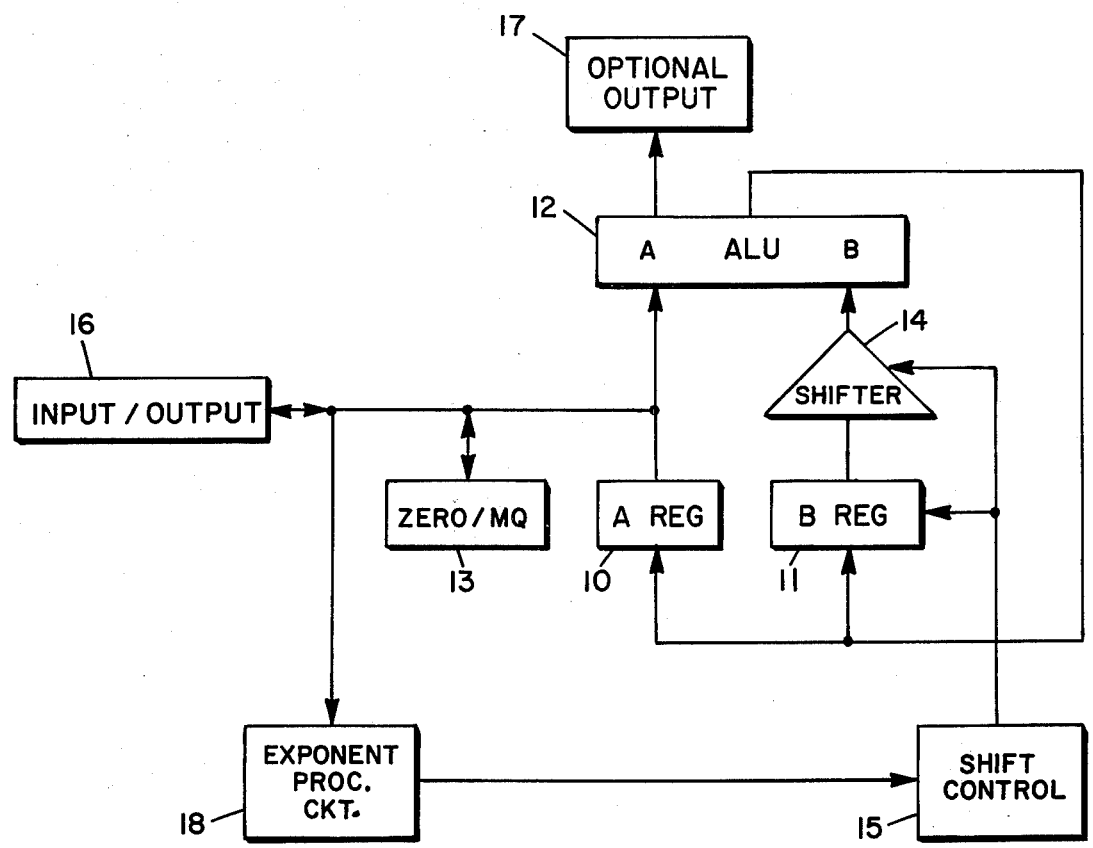

FLOATING POINT PROCESSOR ARCHITECTURE WHICH PERFORMS SUBTRACTION WITH REDUCED NUMBER OF GUARD BITS

BACKGROUND OF THE INVENTION

1. Field of the Invention

This invention is related to computer circuitry, in general, and to a floating point processor which performs a subtraction function, in particular.

2. Prior Art

There are many computer circuits and systems which are known in the art. These computer circuits and systems are used in many applications in the modern day world. Computers of more recent vintage are, of course, much faster, much smaller and much more powerful in operation. In order to achieve all of these attributes, continuing investigation of smaller, faster circuitry is underway. In order to make computers both smaller and faster, it is desirable to reduce the size of various words or numbers so that operations thereon can be expedited. That is, if a word can be made one bit shorter (while maintaining the same content or accuracy), an element in virtually every device in the data path can be saved also. Consequently, it is desirable to achieve system operation with minimal additions or modifications to existing equipment and, as well, word or number construction therein.

One operation and pertinent circuit used in many computers is a floating point processor which operates on floating point numbers. To perform a floating point number subtraction, the number with the smaller exponent has to be denormalized before the subtraction can take place. This is carried out by shifting the mantissa portion of the smaller number to the right by the number of places equal to the difference between the exponents of the numbers. The number is renormalized after the subtraction.

In order to keep the error of the subtraction less than or equal to $\frac{1}{2}$ LSB, some extra storage must be provided to store the bits of data shifted out to the right during the denormalization procedure. These bits also have to participate in the subtraction. The number of these bits, called "guard bits", is usually three or more. It can be shown that, without using special hardware circuitry and doing a subtraction as described above, the error bound will typically be:

$$(\tfrac{1}{2})*(1+2^{(-g+2)}) \text{ LSB}$$

where g is the number of guard bits. In the past, this error bound has been kept close to $\frac{1}{2}$ LSB by adding more guard bits. However, this means added hardware along the whole data path. Moreover, this approach is undesirable because the best error bound ($\frac{1}{2}$ LSB) is still not attained, causing the result of arithmetic calculations to be less than predictable.

It is highly desirable to be able to maintain the error to less than $\frac{1}{2}$ LSB while maintaining a minimum hardware configuration.

SUMMARY OF THE INVENTION

This invention is directed primarily to a subtracting circuit for use with a floating point processor which permits high accuracy without requiring additional guard bits or hardware. In addition, the number of components is minimized. Appropriate registers are provided to store the numbers which represent the subtrahend and minuend of a subtraction operation. An arithmetic logic unit is arranged to receive the signals from the registers and to add the numbers together to form a resultant. The subtrahend is stored in the A register and the minuend in the B register. Instead of doing a denormalization and subtraction, the complement of the minuend stored in B register is formed. This is accomplished by subtracting the contents of the B register from the contents of the A register and storing the result in the B register (A-B→B) while forcing the A input of the ALU equal to zero. These zeros are supplied by the MQ register which is part of the FPP. The contents of the B register is then shifted to the right by the proper number of places so that the exponent difference between the numbers in the A and B registers is zero. (This is the denormalization procedure). The shifted signal is then supplied to the arithmetic logic unit (ALU) along with the signal from the A register which signals or numbers are added together and returned to the B register. The contents of the B register are then normalized, i.e. returned to the original exponent.

BRIEF DESCRIPTION OF THE DRAWINGS

The sole FIGURE depicts a schematic, block diagram of a floating point processor subtractor with reduced guard bit requirements in accordance with the instant invention.

DESCRIPTION OF THE PREFERRED EMBODIMENT

Referring now to the sole FIGURE, a suitable input/output element 16 is provided. This input/output element may be a transceiver of known configuration which receives (and transfers) information from a suitable source. The transceiver 16 is connected to supply signals (binary bits) to ZERO/MQ register 13. Register 13 may be a multiplexer of known configuration which is connected to selectively supply signals to arithmetic logic unit (ALU) 12. The ALU is connected to supply signals to both B register 11 and A register 10. The A register supplies signals directly to the A input terminals of ALU 12 while the B register supplies signals to the B input terminals of ALU 12 via combinational shifter 14.

Shifter 14 is a programmed circuit, e.g. a PROM, which is used to selectively shift the contents of the B register. Typically, shifter 14 is used when the B register contents is shifted four bits or less. This permits the circuit to shift and add (or subtract as determined by the ALU) at the same time thereby providing faster operation. If, however, the shift is to be more than four bits, the shift is performed within the B register. The four bit criterion is noted in this embodiment because of the system timing and the operating speed of the components. In other systems, the number of shifts may be varied. An optional output 17 can be obtained from ALU 12. This portion of the circuit architecture is directed to the "fraction" portion of the numbers being operated upon by the floating point processor (FPP).

Exponent processing circuitry 18 is also connected to receive signals from transceiver 16. Shift control 15 receives signals from exponent processing circuitry 18 and applies shift control signals to both B register 11 and combinational shifter 14. This portion of the architecture is directed to the "exponent" portion of the numbers being operated upon by the FPP.

In the following paragraphs, the function of the registers are described.

Initially, to perform a floating point addition, the mantissa of the first operand is assumed to be stored in both A register 10 and B register 11 by a previous operation. The mantissa of the second operand is loaded into the MQ register 13 from input-output circuit 16. At the same time, the exponent portions of the first operand and the second operand are compared by exponent processing circuitry 18. If the exponent of the first operand is larger than the exponent of the second operand, the mantissa of the second operand which is currently stored in MQ register 13 is transferred to the B register 11. Conversely, if the exponent of the second operand is larger, the mantissa of the second operand is transferred to the A register 10. That is, the operand with the smaller exponent is always stored in the B register 11 because only the contents of the B register 11 may be shifted left or right.

If the operation is a floating point add and the two operands have like signs, the mantissa of the operand with a smaller exponent stored in the B register 11 is denormalized by shifting to the right the number of places equal to the exponent difference. The shifting is controlled by shift control 15. The addition is then performed by adding the contents of A register 10 and B register 11 through ALU 12. The result is stored in the B register and renormalized by shifting the contents left or right so that the leading bit of the mantissa is a binary "1". The exponent is also adjusted accordingly in the exponent processing circuitry 18.

If the floating point operation is an add while the operands have unlike signs or if the floating point operation is a subtract while the operands have like signs, a subtract operation is carried out. Again, it is possible to avoid the guard bit problem described above while using the simple system architecture shown and described herein. That is, the mantissa of the operand with the smaller exponent is stored in the B register 11. However, instead of immediately denormalizing the mantissa (i.e. shifting as in add), the complement of the mantissa is formed first. This can be done easily with this system architecture. That is, the MQ register 13 is cleared to zero and the contents (B) of B register 11 is subtracted from the contents of the MQ register (i.e., 0) by doing a subtraction with the ALU 12. The result (0−B) is stored back in B register 11 effectively producing the complement of B. The content of the B register 11 is then denormalized by shifting right the number of places equal to the exponent difference as in the add operation. Then the contents of the A register 10 and B register 11 are added by means of the ALU 12. Of course, the addition and shifting may occur in combinational shifter 14 as described above. Otherwise, the contents of B register 11 are shifted as controlled by shift control 15. As described above and demonstrated hereafter, the circuit produces the correct result and only two guard bits suffice.

In describing the operation of the circuit, it is believed desirable to describe the subtraction operation produced in existing circuitry and then to compare this operation with the operation of the new apparatus of the instant invention. To this end, reference is made to the following operational description.

STANDARD METHOD
EXAMPLE #1

The subtraction operation will be described for the following numbers:

$$1.000 \times 2^0 - 1.011 \times 2^{-3}$$

Three (3) Guard Bits:

In the standard method, three (3) guard bits are added to the end of the number representing the subtrahend to protect the accuracy of the number. The minuend is shifted to the right 3 bit positions to align the respective numbers inasmuch as the exponents of the numbers differ by three. Thus, the numbers are:

$$\begin{array}{r} 1.000 \mid 000 \ (\times 2^0) \\ -0.001 \mid 011 \ (\times 2^0) \\ \hline 0.110 \mid 101 \ (\times 2^0) \end{array}$$

Thus, the subtrahend has been provided with 3 guard bits (the last three zeros) and the minuend has been rearranged after pre-alignment which required the shift to the right by 3 bit places. The resultant is now normalized by shifting the resultant one bit to the left to place a "1" to the left of the decimal thereby giving:

$$1.101 \mid 01 \ (\times 2^{-1})$$

After round-off (i.e. adding a binary 1 to the bit after the LSB) and dropping of the added guard bits, the resultant number is:

$$1.101 (\times 2^{-1})$$

Two (2) Guard Bits:

If now the same example and subtraction operation is attempted to be produced using only two guard bits in order to effect the obvious savings, the same example appears as follows:

$$\begin{array}{r} 1.000 \mid 00 \quad (\times 2^0) \\ -0.001 \mid 01[1] \ (\times 2^0) \\ \hline 0.110 \mid 11 \quad (\times 2^0) \end{array}$$

It is noted in this operation that the pre-alignment requires a shifting of the minuend by three places to the right. However, only two guard bits have been supplied to the subtrahend. Consequently, the least significant bit (LSB) in this instance a binary 1, is lost. Therefore, the resultant, after renormalization reads as follows:

$$1.101 \mid 1 \ (\times 2^{-1})$$

After rounding off the resultant now is as follows:

$$1.110 (\times 2^{-1})$$

which result is obviously incorrect. Therefore, under the so-called standard method, either three guard bits are required (along with the problems thereof), or an inaccurate answer is obtained using two guard bits.

To further demonstrate the problems of accuracy in these operations, the following examples are given for larger guard bit numbers:

EXAMPLE #2

Subtract $1.1 \times 2^4 - 1.0001001 \times 2^0$

```
Three (3) Guard Bits:

1.1000000 | 000 | 0   (x2⁴)
-  .0001000 | 100 | 1   (x2⁴)
 1.0110111 | 100
+          |   1
 1.0111000 | 000     (x2⁴)
```

In this example, the minuend is shifted to the right four bit positions to normalize. Three guard bits are added to the right of the broken line. The last bit (after the solid line) is chopped off and lost. After subtraction and round off (adding 1) the resultant is obtained.

```
Four (4) Guard Bits:

1.1000000 | 0000  (x2⁴)
-  .0001000 | 1001  (x2⁴)
 1.0110111 | 0111
+          |    1
 1.0110111 | 1111
```

Again, the minuend is shifted for normalization. However, in this case four guard bits are added (as illustrated) to the right of the broken line.) After subtraction and round off, the resultant is obtained which is more accurate than the three guard bit example.

EXAMPLE #3

Subtract $1.1 \times 2^5 - 1.0010001 \times 2^0$

```
Four (4) Guard Bits:

1.1000000 | 0000 | 0   (x2⁵)
-  .0000100 | 1000 | 1   (x2⁵)
 1.0111011 | 1000
+          |    1
 1.0111100 | 0000     (x2⁵)
```

Again, the numeral is shifted for normalization and four guard bits are added. The last bit in the numeral is lost. After subtraction and round off, the resultant is obtained.

```
Five Guard Bits:

1.1000000 | 00000  (x2⁵)
-  .0000100 | 10001  (x2⁵)
 1.0111011 | 01111
+          |     1
 1.0111011 | 11111  (x2⁵)
```

This process produces a more accurate number (when the five guard bits are discarded.) Nevertheless, five guard bits are unwieldy and almost impossible to handle in a reasonable fashion.

Now, the apparatus of the instant invention is utilized and the new method can be implemented.

NEW METHOD

Using the Example #1 as described above, the subtraction operation is performed with only two guard bits. However, the initial step is to obtain the complement of the minuend (i.e. subtract the minuend from zero). It is clear that the complement of (000)1.011 is (111)0.101. Therefore, the new equation is as follows:

```
 1.000 | 00       (x2⁰)
+1.110 | 10[1]    (x2⁰)
 0.110 | 10       (x2⁰)
```

Thus, it is seen that the minuend is the complement of a previously supplied minued. This complement is pre-aligned by shifting to the right 3 bit places. Again the LSB bit, in brackets, is lost in the operation. However, the operation now is an addition and the sum is as follows:

$$1.10100 (\times 2^{-1})$$

After round-off and dropping of guard bits, the result now is as follows:

$$1.101 (\times 2^{-1})$$

which result is the same as the result obtained by using three guard bits in the previous apparatus or standard method. Many other examples can be worked to show the accuracy of this circuit and method.

Thus, a circuit is provided with permits a floating point processor operation which has a high order of accuracy but requires fewer guard bits than the prior art. By utilizing one less guard bit, a savings of elements in each device in the data path is effected. Moreover, accuracy of ½ bit in the LSB is achieved. The examples shown are not intended to be limitative but are illustrative only, It is clear that other examples can be worked which will prove the capability of the circuit. Therefore, the illustrative example is not intended to be limitative of the invention. Rather, the invention is limited only by the scope of the claims appended hereto.

Having thus described a preferred embodiment of the invention, what is claimed is:

1. A floating point processor circuit for operating an floating point numbers each of which comprises an exponent and a number, comprising:
   first register means for storing a first number;
   second register means for storing a second number;
   third register means for storing a third number;
   arithmetic logic means, the outputs of said arithmetic logic means connected to the inputs of at least two of said first, second and third register means, the inputs of said arithmetic logic means connected to the outputs of each of said first, second and third register means such that said arithmetic logic means is operative for selectively receiving the respective number stored in any selected two of said first, second and third register means and performing an operation thereon to produce a resultant number and returning the resultant number of said operation to said first register means for storage therein as said first number, and
   shift control means connected to said first register means to selectively shift the resultant number stored in said first register means in accordance with the difference between the exponents associated with said first and second numbers.

2. The processor circuit recited in claim 1 wherein:
   said third number is a binary zero whereby the resultant number returned to said first register is the complement of said first number when the operation performed by said arithmetic logic unit is a subtraction of said first number from said third number.

3. The processor circuit recited in claim 1 wherein:
said arithmetic logic means adds the contents of said first and second register means and returns the result to said first register means.

4. The processor circuit recited in claim 1 wherein:
said arithmetic logic means substracts the contents of said first register means from the contents of said third register means to form the complement of said first number and returns said complement to said first register means.

5. The processor circuit recited in claim 1 wherein, said first number is smaller than said second number.

6. The processor circuit recited in claim 1 wherein, said shift control means is operable to shift the contents of said first register to either the right or to the left to effect normalization and renormalization thereof.

7. The processor circuit recited in claim 1 including:
shifter means connected between said first register means and said arithmetic logic means to selectively shift the contents of said first register means for application to said arithmetic logic means.

8. The processor circuit recited in claim 7 including:
means for connecting said shift control means to said shifter means.

9. The processor circuit recited in claim 7 wherein, said shifter means is operable to shift the contents of said first register means by up to four bit places.

10. The processor circuit recited in claim 7 wherein, said shifter means comprises a programmable memory circuit.

11. The processor circuit recited in claim 1 including:
input circuit means for supplying said first number to said first register means, said second number to said second register means and said third number to said third register means.

12. The processor circuit recited in claim 11 including:
exponent processor circuitry connected between said input circuit means and said shift control means to control the operation of said shift control means as a function of difference in the exponents of the numbers supplied by said input means.

13. The processor circuit recited in claim 12 wherein:
said first, second and third numbers stored in said first, second and third register means respectively are the mantissas of floating point numbers, and
said exponent processor circuitry operates upon the exponents of said floating point numbers.

14. The processor circuit recited in claim 11 wherein:
said first and second numbers are supplied from said input circuit means to said first and second registers via said arithmetic logic means.

15. The processor circuit recited in claim 11 wherein:
said third register means supplies said third number to said arithmetic logic unit.

16. A method for performing floating point number subtraction, comprising the steps of:
storing the mantissa of a first number in a first register;
storing the mantissa of a second number in a second register;
forming the complement of said mantissa of said second number by subtracting the mantissa of said second number from zero and storing said complement in said second register, and
adding said mantissa of said first number to said complement in an arithmetic logic unit.

17. The method recited in claim 16 including the steps of:
comparing the exponents of said first and second numbers so that the number with the smaller exponent is stored in said second register.

18. The method recited in claim 9 including the steps of:
shifting the contents of said second register to normalize the number stored in said second register relative to the number stored in said first register.

* * * * *